June 23, 1953   C. L. LUNDGREN   2,643,041
SPARE TIRE MOUNTING FOR AUTOMOBILES
Filed July 21, 1950   2 Sheets-Sheet 1

INVENTOR
Chester L. Lundgren
BY Dillon S. Turney
HIS ATTORNEY

June 23, 1953 C. L. LUNDGREN 2,643,041
SPARE TIRE MOUNTING FOR AUTOMOBILES
Filed July 21, 1950 2 Sheets-Sheet 2
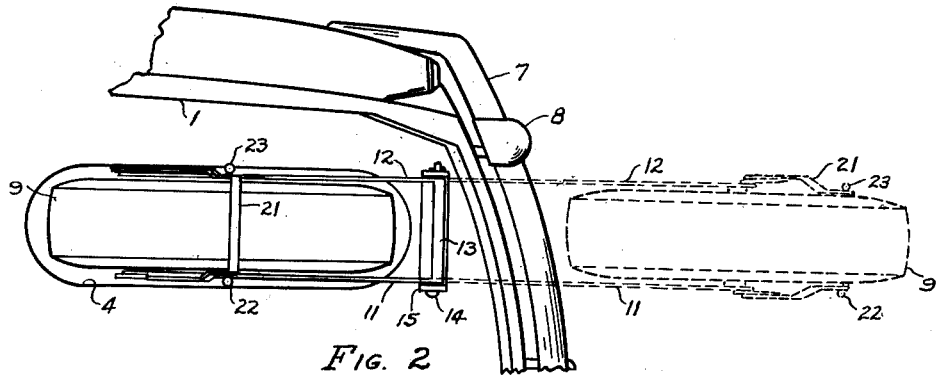
FIG. 2
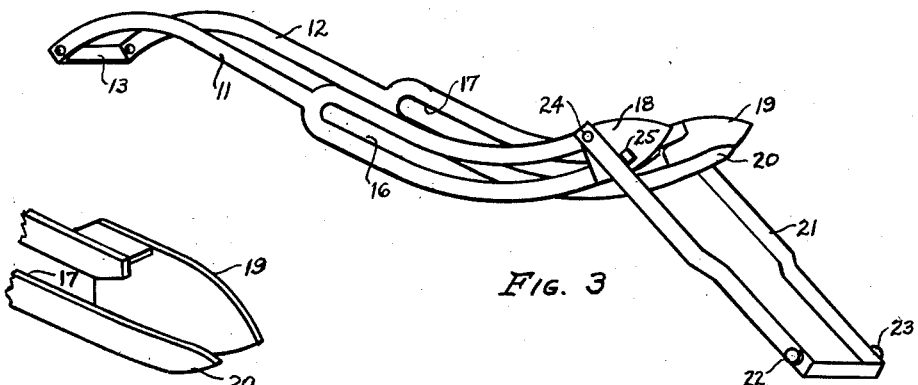
FIG. 3
FIG. 4
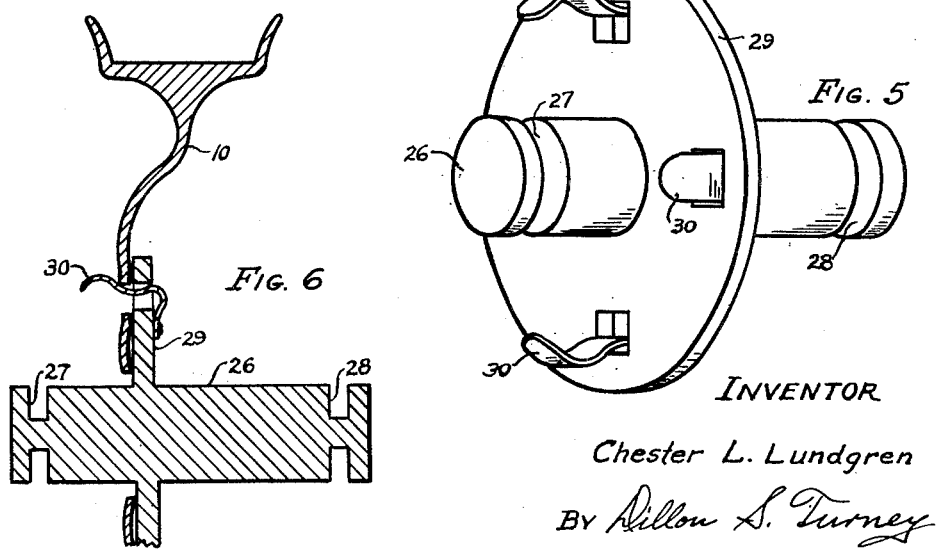
FIG. 5
FIG. 6
INVENTOR
Chester L. Lundgren
BY Dillon S. Turney
HIS ATTORNEY Patented June 23, 1953

2,643,041

UNITED STATES PATENT OFFICE 2,643,041

SPARE TIRE MOUNTING FOR AUTOMOBILES

Chester L. Lundgren, Bonaparte, Iowa

Application July 21, 1950, Serial No. 175,179

4 Claims. (Cl. 224—42.22)

My invention relates to a spare wheel mounting device for automobiles, and more particularly to an improved type of device for loading and unloading the spare tire and wheel in an automobile luggage compartment.

In recent years, the practice has become prevalent among automobile manufacturers to carry the spare wheel and tire for the automobile in an upright position in a recessed well in the luggage compartment in the rear of the automobile. The wheel is usually clamped in an upright position by means of bolts and clamping plates, and is particularly difficult to remove due to the placing of luggage around the wheel or adjacent thereto, together with the necessity of using wrenches or tools to remove the clamping members. The removal is further complicated by the necessity of reaching into the compartment and lifting the wheel and tire, which may weigh from 20–40 pounds, while in an awkward position to remove it from the well. Even under best conditions, it is a difficult job for women and elderly persons, due to the strain involved in lifting the heavy wheel and tire from the compartment and replacement therein, and may result in exhaustion, severe physical strains, soiling of clothing and other inconveniences.

It is, therefore, an object of my invention to provide a simple, easily operated spare tire mounting device for passenger automobiles.

It is a further object of my invention to provide a light-weight, inexpensive, easily operated tire loading and unloading device adapted for installation in the luggage compartment of a passenger automobile.

It is still another object of my invention to provide a tire loading and unloading device for automobiles which is adapted for installation in the majority of existing modern automobiles, and which allows the spare wheel and tire to be quickly and easily removed or replaced from the luggage compartment with a minimum of physical strain and exertion.

In practicing my invention, I provide a pair of spaced parallel arms which are pivoted at the rearward edge of the luggage compartment. These arms are disposed on each side of the spare tire and wheel as it stands in the upright position in the well portion of the luggage compartment floor. A center spindle having spring clip means for gripping the wheel extends through the center of the wheel and is carried by guide slots in the arms. An operating handle is attached to the free ends of the arms, thereby permitting the operator to easily grasp the handle and by merely pulling rearwardly, the spare wheel and tire rolls up out of the well over the back edge of the luggage compartment and bumper and easily down on to the ground. The wheel may then be pulled out of the open end of the guide slots, the center spindle removed and the wheel is ready for replacement on the automobile. No direct lifting is involved since a rolling action removes the wheel from the compartment.

From the foregoing description, it will be seen that the operation of this device is extremely simple and easy and eliminates the use of wrenches for loosening bolts, the grasping of the tire by hand and lifting it from the well and carrying it to the ground. The same advantages are also apparent in replacing a wheel and tire in the luggage compartment.

My invention will be best understood from the following detailed description taken in connection with the accompanying drawings and its scope will be pointed out in the appended claims.

In the drawing, Figure 1 is a side view of the rear end luggage compartment of an automobile shown partially in section and illustrating the spare tire and wheel in place, and also in the removed position as shown in dotted lines. Figure 2 is a plan view of the same portion of the automobile and showing my invention in the same relative positions as in Figure 1.

Figure 3 is a perspective view of the tire loading and unloading device without the wheel and tire in place. Figure 4 is a perspective view on an enlarged scale of a detail of one end of the unloading device as shown in Figure 3.

Figure 5 is a perspective view of the wheel center spindle used in conjunction with the unloading device of Figure 3, and Figure 6 is a sectional view of the center spindle of Figure 5 in place and engaging the center of an automobile wheel.

Figure 1:
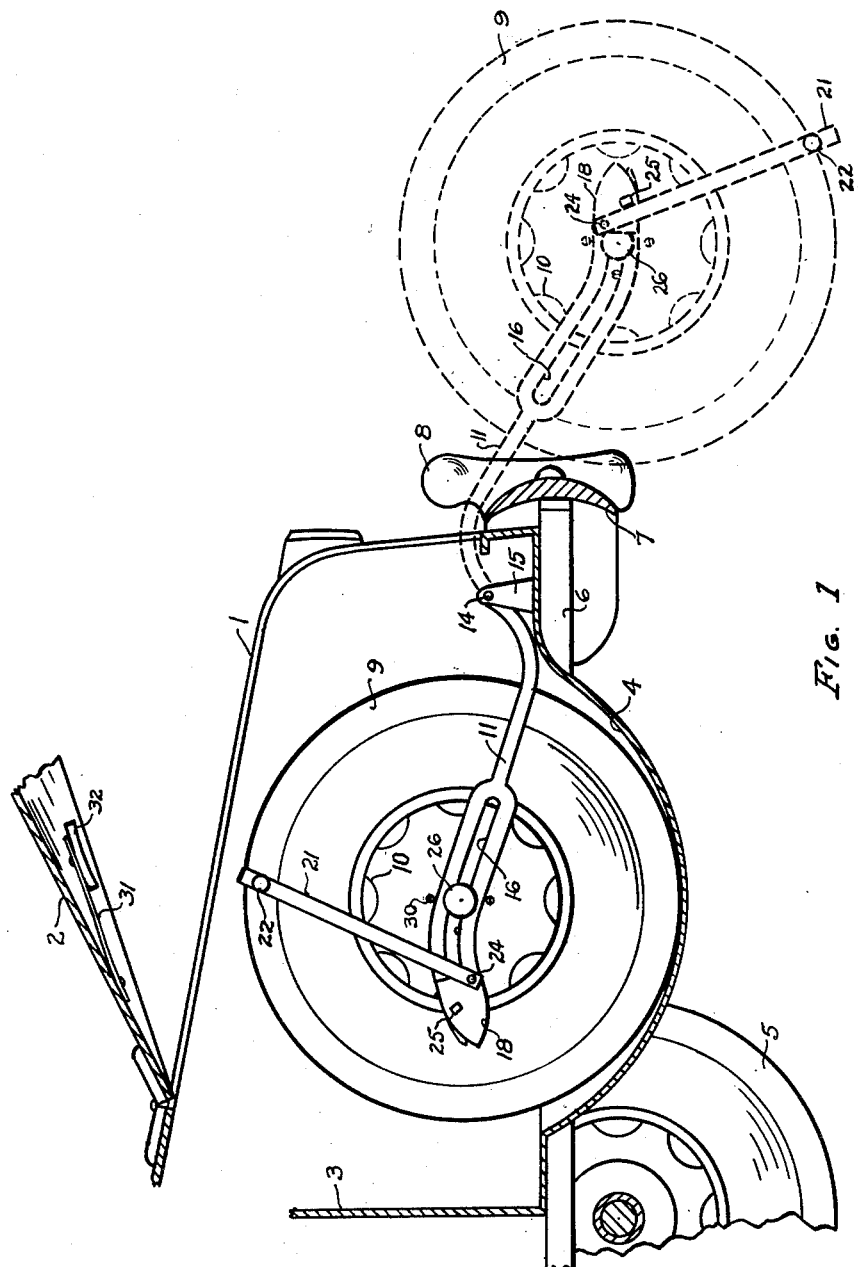

Referring now to Figure 1 of the drawing, I have shown the rear body portion 1 of an automobile which is provided with a cover or closure 2, a forward wall 3 and a floor or deck having a recessed well portion 4 therein. Also shown for completeness is one of the automobile's rear wheels 5, the longitudinal frame member 6 and the rear bumper 7 shown in cross section. A bumper guard 8 is shown, and from Figure 2 it will be apparent that the bumper guards will not interfere with operation of my invention due to their wide spacing on the rear bumper 7.

The spare tire 9 and wheel 10 is secured in the upright position within the well 4 as shown by means of the tire loading and unloading device which forms the subject of my invention and consists of the parallel spaced arms 11 and 12, both of which may be more easily seen in Figures 2 and 3. At one end, the arms 11 and 12 are joined by the spacing bar 13 and are pivoted for rotary motion at this point by means of the pivot 14 and bracket 15 which is secured to the floor or deck of the luggage compartment.

As shown in Figure 3, the arms 11 and 12 are somewhat S-shaped and are bifurcated for approximately the outer one-half of their length, thereby forming a guide slot 16 in the arm 11, and guide slot 17 in the arm 12. The bifurcated outer end portions of the arms 11 and 12 are maintained in rigid spaced relationship by means of the end plates 18 and 19 respectively, and it will be noted from Figure 4, that the lower member 20 of the arm 12, extends beyond the upper member and forms a guide to direct the wheel carrying spindle into the guide slot 17 when loading a wheel and tire into the device while on the ground. A similar construction is employed in connection with the other slotted arm 11.

The operating handle 21 is of substantially U-shape construction and is provided with nobs 22 and 23 and is pivoted at the point 24 to the end plate 18 and a similar pivot is provided on the end plate 19. As shown in Figure 1, in the solid line position, the handle 21 rests upon the top of the tire 9 and the nob 22 is in position for easy manipulation by the operator. In the dotted line position of Figure 1, it will be noted that the handle 21 rests upon the ground and against the stop 25, the stop member 25 being securely fixed to the end plate 18, and a similar stop being provided on the other end plate 19. Thus, in the dotted line position of Figure 1, it will be apparent that the handle 21, in cooperation with the stop 25, places device at the correct position above the ground so that the guide slots 16 and 17 are parallel with the ground at their open ends, and are disposed in proper position to receive or discharge the wheel carrying spindle 26.

The wheel carrying spindle 26 is shown in enlarged detail in Figure 5 and is provided with a pair of annular grooves 27 and 28 which are spaced to cooperate with the guide slots 16 and 17 respectively. A plate or flange 29 is secured to the spindle 26 and is provided with a plurality of spring clips 30 which are spaced on the flange 29 in proper position to engage the mounting bolt holes with which all present steel automobile wheels are provided. Reference to Figure 6, which shows a portion of the automobile wheel 10 with the spindle 26 in position in the center thereof, illustrates the manner in which the spring clips 30 extend through the bolt holes of the wheel center 10 and hold the spindle 26 securely in position in the center of the wheel. It will be obvious that since the number of wheel mounting studs varies in different makes of automobiles, it will be necessary to provide the corresponding number of spring clips 30 on the flange 29 so that correct alignment of the clips 30 and bolt holes in the wheel center 10 will result. This construction forms an easily removable wheel carrying spindle since it is only necessary to twist slightly or pull the spindle 26 in order to release the spring clips 30 from the bolt holes, and conversely, the spindle is easily attached to the wheel by lining up the spring clips 30 with the bolt holes and forcing or tapping it sufficiently to drive the clips through the bolt holes into the gripping position.

In describing the operation of the device, let it be assumed that the operator wishes to remove the spare tire and wheel from the luggage compartment, in which case the parts will be in a position as shown by the solid lines in Figure 1. It is only necessary for the operator to grasp the operating nobs 22 and 23 on the handle 21 and pull rearwardly, whereupon the entire assembly will rotate clockwise around the pivot 14 and the tire 9 will roll up out of the well 4 over the back edge of the luggage compartment and top of the bumper 7 and, at the same time, the wheel carrying spindle 26 will roll or slide in the guide slots 16 and 17 toward the pivot 14. As the operator continues to pull rearwardly, the operating handle 21 will reach the stop 25 and the operator can then lower the entire assembly to the ground and the spindle 26 will roll downwardly in the guide slots 16 and 17 until the tire 9 rests upon the ground. It is only necessary for the operator then to grasp the top of the tire 9 and roll it rearwardly whereupon the spindle 26 will disengage from the guide slots and the wheel and tire is then entirely free of the unloading device. A simple twist of the spindle 26 is all that is necessary to disengage the spring clips 30 from the bolt holes in the wheel center and the spare wheel and tire is ready for use. In replacing a wheel and tire in the luggage compartment, the reverse procedure is followed. The spindle 26 is pressed into engagement with the wheel center until the clips 30 are all in gripping position, as shown in Figure 6, and the wheel is rolled up to the open end of the loading device. The end plates 18 and 19 which are slightly flared outwardly act to guide the ends of the spindle 26 into the proper position where the grooves 27 and 28 can engage with the guide slots 16 and 17 respectively. The operator will then grasp the nobs 22 and 23 on the handle 21 and lift, whereupon the spindle and the wheel and tire will roll in the guide slots 16 and 17 toward the pivot 14 and, as the lifting is continued, the tire 9 will roll up over the bumper, the rear edge of the luggage compartment and down into the well 4. At the completion of this movement, the handle 21 will then be in position in solid lines in Figure 1. The amount of direct lifting of wheel and tire is greatly reduced, partly due to the rolling of the spindle up the incline of the guide slots 16 and 17 and partly due to the mechanical advantage of the handle 21 and arms 11 and 12 which is approximately a 2:1 lever arm.

If it is found that there is any noise due to vibration of the spare wheel when the car is traversing rough roads, a wheel clamp may be provided on the inner surface of the luggage compartment closure. Although it is obvious that many forms may be devised, a simple form of clamp that may be used is shown in Figure 1 and consists of a biasing spring 31 provided with a tire engaging pad 32 of rubber or other suitable material, which may be slightly concave in order to grip the top of the tire 9. As the closure 2 is closed, the pad will engage the top of the tire 9 and the spring will be stressed upwardly, thereby securely holding the tire from any sidewise, vertical or fore and aft motion.

From the foregoing description, it will be apparent that my improved spare tire loading and unloading device provides an extremely efficient and easily operated means of removing a spare wheel and tire from the luggage compartment of a passenger automobile and for replacing the tire therein. The necessity for heavy lifting and the exertion required in grasping the tire with hands and lifting it out of the compartment or back into the compartment is eliminated, and the need for wrenches, clamping studs and bolts and other mounting paraphernalia is obviated. The device is easily operated by women, elderly people, and those having physical limitations and is designed so that it may be inexpensively manufactured and easily installed in all types of modern passenger automobile which carry the spare wheel and tire in a well in the luggage compartment.

While I have shown and described a particular embodiment of my invention, it will be obvious to those skilled in the art that changes and modifications may be made therein without departing from my invention in its broader aspects and I, therefore, aim in the appended claims to cover all such changes and modifications as fall within the true spirit and scope of my invention.

What I claim as new and desire to secure by Letters Patent of the United States is:

1. In combination with a vehicle having a load carrying space, a spare wheel and tire mounting frame pivoted at one edge of said space for rotary motion in a vertical plane into and out of said space, a tire carrying spindle releasably engageable with said mounting frame, said spindle being removable from said mounting only in the outside position of said frame with respect to said space, spring clip means on said spindle for engaging said wheel and tire, and a swinging operating handle attached to the end of said frame opposite said pivoted point.

2. In combination with a vehicle having a load carrying space, a wheel and tire mounting frame pivoted in said space for rotary motion in a vertical plane from a position inside of said space to a position entirely outside of said space, said frame including a pair of spaced parallel arms, guide slots in said arms, an operating handle attached at one end of each of said arms, a wheel carrying spindle having an annular groove at each end thereof and arranged to extend transversely between said arms when in engagement therewith, and a flange on said spindle provided with a plurality of spring clips for gripping a vehicle wheel.

3. In combination with an automobile rear end luggage compartment having an elongated wheel receiving recess in the floor thereof, a wheel carrying frame pivoted at one end thereof to a point on said floor adjacent the rear end of said wheel receiving recess, said frame including a pair of parallel spaced arms connected at their end opposite said pivot by a U-shaped operating handle, a guide slot in each of said arms extending from the approximate center thereof to the outermost end thereof said slot being open at the outer end, a wheel carrying spindle having an annular groove in each end thereof for engaging said guide slots when said spindle is inserted in the open end of said slots, and means on said spindle for gripping an automobile wheel.

4. In combination with the rear end luggage compartment of a motor vehicle, means in the floor of said compartment for receiving a vehicle wheel and tire, a wheel carrying frame pivoted at one end thereof to said compartment floor adjacent to said wheel receiving means, said frame being swingable around said pivot from a position above said wheel receiving means and inside said compartment to a position substantially outside of said compartment, a pair of parallel bifurcated arms forming said frame and arranged to receive a spindle thereon, a spindle having a centrally disposed flange and annular grooves at each end of said spindle, and spring clip means on said flange for releasably gripping an automobile wheel and tire assembly.

CHESTER L. LUNDGREN.

References Cited in the file of this patent

UNITED STATES PATENTS

| Number | Name | Date |
|---|---|---|
| 1,472,983 | Lawrence | Nov. 6, 1923 |
| 1,502,583 | Pepin | July 22, 1924 |
| 1,877,887 | Fulton | Sept. 20, 1932 |
| 2,034,834 | Robinson, Jr. | Mar. 24, 1936 |
| 2,063,598 | Franklin | Dec. 8, 1936 |
| 2,162,046 | Albinson | June 13, 1939 |
| 2,210,085 | Langdon | Aug. 6, 1940 |
| 2,264,000 | McKechnie | Nov. 25, 1941 |
| 2,547,083 | Lundgren | Apr. 3, 1951 |